O. P. BARNES.
COOLER AND WATER FILTER.
APPLICATION FILED AUG. 18, 1920.
1,432,522.     Patented Oct. 17, 1922.
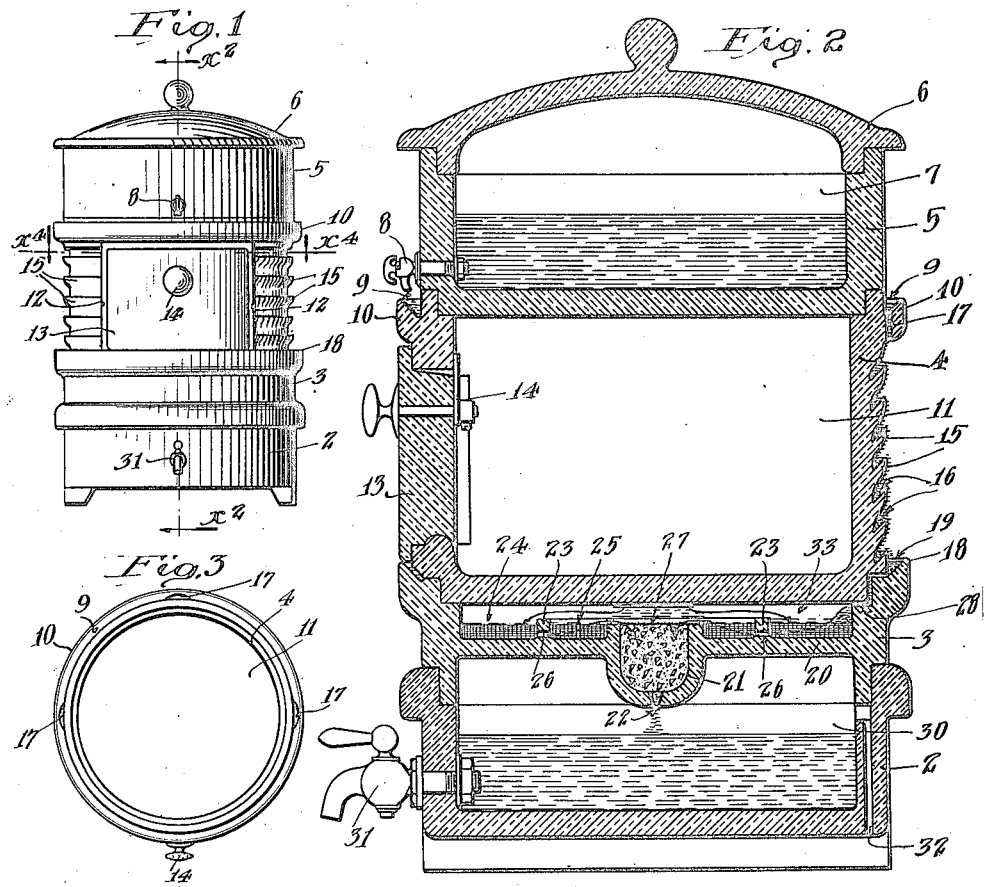
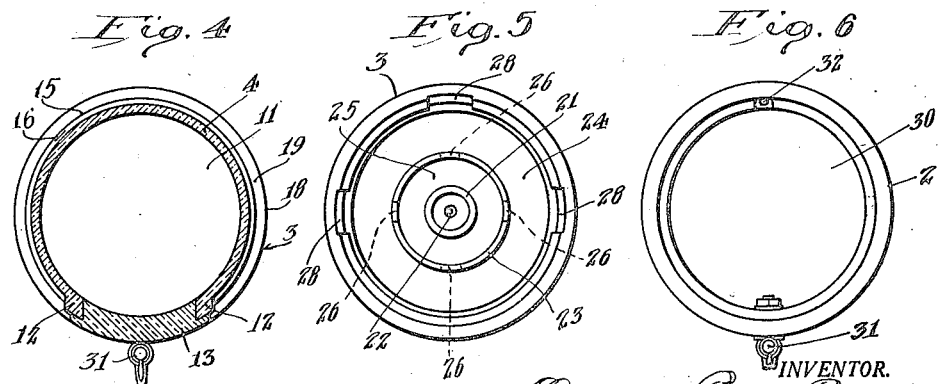
INVENTOR.
Orange Perry Barnes.
BY
ATTORNEY.

Patented Oct. 17, 1922.

1,432,522

UNITED STATES PATENT OFFICE.

ORANGE PERRY BARNES, OF LONG BEACH, CALIFORNIA.

COOLER AND WATER FILTER.

Application filed August 18, 1920. Serial No. 404,436.

*To all whom it may concern:*

Be it known that I, ORANGE PERRY BARNES, a citizen of the United States, residing at Long Beach, in the county of Los Angeles and State of California, have invented a new and useful Cooler and Water Filter, of which the following is a specification.

This invention relates to a cooler and water filter and is particularly directed to a device in which a relatively low temperature is maintained within the cooler by evaporation of water, and in which the water is aerated and filtered to render it potable and pure.

The object of the invention is to provide a device in which the cooler is formed to provide a relatively large area of exposed surface over which is entrained a film of water, said water film being exposed to air currents circulating about the device, producing a rapid evaporation of a portion of the water to maintain a relatively low temperature within the cooler and the surplus water being aerated and subsequently filtered to render it potable and healthful for drinking purposes.

Another object is to form the exterior surface of the cooler so that the water film flows in cascade formation over said surface.

Among the several other objects of the invention is the provision of means for regulating the flow of the cooling water; the construction of the device in separable units whereby any number of cooling units may be assembled in superposed relation, and whereby the separate units may be conveniently cleaned; the provision of a filtering unit conveniently accessible for renewing the filtering materials; and the provision of means for storing the filtered water and drawing it from said storage means for use.

Various other objects and advantages will be more fully apparent from the following description of the accompanying drawings, which form a part of this disclosure, and which illustrate a preferred form of embodiment of the invention.

Of the drawings:

Figure 1 is a front elevation of the device.

Fig. 2 is an enlarged vertical section on line $x^2$—$x^2$ of Fig. 1.

Fig. 3 is a top plan view of the cooling chamber unit.

Fig. 4 is a plan section on line $x^4$—$x^4$ of Fig. 1.

Fig. 5 is a top plan view of the filtering unit, with the filtering materials removed.

Fig. 6 is a top plan view of the lower water storage unit.

Referring to the drawings, the general arrangement of the sectional units comprises a lower water storage base unit 2, serving as a drinking water chamber, a filter unit 3 superposed upon the base unit 2, a cooler unit 4 superposed upon the filter unit 3 and providing a cooling chamber, and a water supply unit 5 superposed upon the cooler unit 4 and provided with a cover 6. The several sections are illustrated as being of cylindrical form, and are preferably formed of porcelain, glass pottery or other like material which may be easily cleaned and sterilized. With particular reference to Fig. 2 it will be noted that the lower peripheral edge of each of the three upper sections or units is stepped so as to intermeshingly engage the upper stepped surface of the next lower unit, this construction serving to relatively align the several sections and prevent their accidental displacement.

The unit 5 forms a water supply chamber 7 and is provided with an outlet valve 8 directing water from the chamber 7 and into an annular trough 9 which is formed in the upper surface of an annular flange 10 of the cooler unit 4.

The cooler unit 4 forms a cooling chamber 11 as a receptacle for foods or other articles and has a raised panel 12 provided with a door opening affording access to the cooling chamber and adapted to be closed by a door 13, the door being provided with a suitable latch 14 to maintain it in closed position. The side wall of the unit 4 has a series of ledges 15 extending from one vertical edge of the panel 12 and around the circumference of the unit to the opposite vertical edge of said panel, the ledges forming horizontally parallel grooves 16. Vertical ports 17 located at intervals along the trough 9, extend through the flange 10 and serve to entrain water from said trough downwardly to the outer surface of the cooler unit.

The filter unit 3 has a peripheral ledge 18 which, with the side wall of the cooler unit 4, forms a channel 19 adapted to receive water flowing downward from said side wall. The floor partition 20 of the filter unit has a central well or cup 21 having a medial outlet port 22, the side walls of the well extending above the floor. Spaced from and concentric with the cup is a wall 23 extending upwardly from the floor 20 and defining an outer filter channel 24 and an inner filter channel 25 (see Fig. 5), the wall 23 extending to a slightly greater height above the floor than the wall of the central cup 21. Transverse ports 26 extending through the wall 23 adjacent the floor 20 afford communication between the two filter channels, in the present device four of such ports being provided. The inner and outer filter channels are filled with suitable filtering material, such as coarse sand, and the central well or cup is filled with granular charcoal and a screen or porous fabric 27 is placed over the well. The upper stepped surface of the filter unit 3 is provided with notches 28 at relatively spaced intervals, (see Fig. 5), said notches communicating with the bottom of the channel 19 and extending inwardly and downwardly over the stepped surface to discharge the water into the outer filter channel 24.

The lower base unit provides a storage chamber 30 in which the filtered water is stored for drinking purposes, a faucet 31 being provided to draw the water therefrom, and the unit being also provided with an overflow duct 32.

The device is preferably placed in a position permitting a free circulation of air on all sides of its exposed surface, and the cooling water is placed in the supply chamber 7. The valve 8 is then opened to allow the water to flow into the trough 9 from which it flows through the vertical ports 17 downwardly and over the outer surface of the cooler unit 4. As each of the grooves 16 are blocked at their terminal ends by the raised panel 12 and are horizontally disposed, the water will first fill the upper groove and then overflow into the next lower groove, this filling and overflowing of the successive grooves continuing throughout the entire height of the cooler unit 4, the water discharging into the channel 19, from which it flows through the notches 28 into the filter chamber 33.

The valve 8 is regulated to maintain a constant flow of the water in cascade form over the wall of the cooler unit, and to maintain water in the trough 9 and channel 19.

With this ledge construction forming the grooves around the wall of the cooler unit, the exposed area of said wall is materially increased over the area of a plain wall, and the water cascaded over this increased area and exposed to circulating air currents is subjected to a relatively rapid evaporation tending to maintain a relatively low temperature within the cooling chamber 11, also this cascade flow thoroughly aerates the surplus water making it more potable and heathful.

When the water reaches the bottom of the cooler unit 4 it is caught in the channel 19 and directed into the filter chamber 33 through the notches 28, flowing first into the outer filter channel 24, through the contained filtering material and through the ports 26 and into the inner filtering channel 25. Flowing through the filtering material in the channel 25 the water overflows the upper rim of the cup 21, passing through the strainer 27 and into the cup and through the granular charcoal therein. From the cup 21 the filtered water flows through the medial port 22 and into the storage chamber 30 in the base unit 2 from which it may be drawn through the faucet 31 for use or from which it flows through the overflow duct 32 as the chamber becomes filled.

The wall 23 of the filter unit is higher than the rim of the central cup so that when the filter channels become filled with water, the incoming water will be prevented from flowing directly over the wall 23 and into the cup 21, the wall 23 compelling all the water to flow through the filtering material, as indicated by the arrows in Fig. 2.

The adjustment of the supply valve 8 will vary according to the rate of evaporation, the flow being regulated to keep a film of cooling water in continuous motion over the surface of the cooler unit 4. This flow is relatively slow as it has been found that in devices of small size a flow of one or two drops per minute will suffice, and by reason of this slow movement of the water in a thin film, the evaporation is of a maximum amount with a subsequent maximum cooling effect and a maximum aeration of the water.

This device provides a cooler and filter which produces a lower temperature in the cooling chamber than can otherwise be obtained without the use of ice or chemicals, which provides for a thorough cooling, aeration and filtering of the cooling water permitting its use for drinking purposes, and which can conveniently be maintained in a sanitary condition.

The device is exceedingly economical to manufacture and its operating cost is exceedingly cheap as compared with that of other like devices.

I claim:—

1. A device of the class described combining a body providing a water cooling and aerating unit and a superposed water supply chamber, the wall of the aerating unit having a plurality of horizontally disposed grooves formed in its exterior surface in superposed relation, means directing the water from the supply chamber to fill and overflow the grooves, a filtering unit having a receiving channel into which the water overflows from the lower groove, and a water storage unit receiving water from the filtering unit.

2. A device of the class described combining a body providing an upper water supply chamber and a lower water cooling and aerating unit having a plurality of downwardly extending horizontal grooves formed in the external surface of its wall, means directing water from the supply chamber to said surface to successively fill and overflow the grooves, a filtering unit having a receiving channel into which the water overflows from the lower grooves, and a water storage unit receiving water from the filtering unit.

3. A device of the class described combining a water cooling and aerating unit providing a cooling chamber, a superposed water supply unit providing a water supply chamber, the aerating unit having an upper peripheral trough and ports communicating with said trough with their discharge ends adjacent the surface of said unit below the trough, said aerating unit also having a plurality of horizontal grooves formed in its external surface below the trough, means directing water from the supply chamber to the trough, the water escaping through the ports to successively fill and overflow the grooves, a filtering unit having a receiving channel into which the water overflows from the lower groove, and a water storage unit receiving water from the filtering unit.

4. A device of the class described combining a body providing a water cooling and aerating unit and a superposed water supply chamber, means directing water from the supply chamber to the exterior surface of the aerating unit wall, the wall surface being formed to produce a cascade flow of the water downwardly over said wall, a filtering unit having a receiving channel into which water from the exterior surface of the cooling and aerating unit wall drains, and a water storage unit receiving water from the filtering unit.

5. A device of the class described combining a series of superposed units comprising a base unit providing a water storage chamber, a filtering unit discharging into the storage chamber and having a receiving channel, a water cooling and aerating unit providing a cooling chamber having the base of its exterior wall surface positioned within the channel of the filtering unit and having a series of superposed horizontal grooves formed in said surface above said channel, and a trough above the top groove and communicating therewith, a water supply unit providing a supply chamber, and means directing water from the supply chamber into the trough whereby said water is entrained to the exterior surface of the wall of the aerating unit to successively fill and overflow the grooves and flow in a cascade film down said wall and drain into the receiving channel of the filtering unit and then pass through the filtering unit and drain into the storage chamber.

6. A device of the class described combining a series of superposed units comprising a base unit providing a water storage chamber, a filtering unit discharging into the storage chamber and having a receiving channel, a water cooling and aerating unit providing a cooling chamber having the base of its exterior wall surface positioned within the channel of the filtering unit and having a trough near the top of said wall surface with ports communicating with the trough and discharging on said wall surface, a water supply unit providing a supply chamber, and means directing water from the supply chamber into the trough whereby said water is entrained through the ports to flow over the exterior surface of the aerating unit and drain into the receiving channel of the filter unit and then pass through the filter unit and drain into the storage chamber.

Signed at Los Angeles, California this 11th day of August, 1920.

ORANGE PERRY BARNES.

Witnesses:
CLARENCE B. FOSTER,
L. BELLE WEAVER.